United States Patent [19]

LeBell

[11] 4,037,683
[45] July 26, 1977

[54] MOTORVEHICLE SAFETY CUT-OUT SWITCH

[76] Inventor: Gene LeBell, 1260 Hayworth Ave., No. 10, Los Angeles, Calif. 90046

[21] Appl. No.: 623,595

[22] Filed: Oct. 20, 1975

[51] Int. Cl.² .............................................. B60K 28/00
[52] U.S. Cl. .................................... 180/99; 200/52 R; 200/161
[58] Field of Search ................... 180/99, 103 R, 82 R; 200/161, 61.19, 153 F, 153 K, 52 R, 61.58 R; 123/198 DC

[56] References Cited

U.S. PATENT DOCUMENTS

| | | | |
|---|---|---|---|
| 2,722,575 | 11/1955 | Dobkins | 180/82 R |
| 2,725,947 | 12/1955 | Dooley | 180/82 R |
| 2,802,074 | 8/1957 | Pass | 200/61.19 |
| 3,210,494 | 10/1965 | Murdock | 200/161 |
| 3,654,411 | 4/1972 | Wohnlich | 200/61.19 |
| 3,734,230 | 3/1971 | Tanaka | 180/99 |
| 3,760,134 | 9/1973 | McCray | 200/52 R |
| 3,786,892 | 1/1974 | Horton | 180/99 |
| 3,821,504 | 6/1974 | Schomaker et al. | 200/161 |
| 3,825,092 | 7/1974 | Graydon et al. | 180/99 |
| 3,881,461 | 5/1975 | Filip | 180/82 R |
| 3,938,613 | 2/1976 | Raborn | 180/82 R |

Primary Examiner—Joseph F. Peters, Jr.
Assistant Examiner—Jack D. Rubenstein
Attorney, Agent, or Firm—Lindenberg, Freilich

[57] ABSTRACT

A motorvehicle safety cut-out switch spring biased in a closed position to cut out the vehicle motor is contained in a housing which includes retaining means for receiving a spherical body through a flaired and resilient opening, and includes means for opening the switch in response to the presence of the spherical body in the retaining means. A lanyard connected to the spherical body is attached to a motorvehicle rider to yank the spherical body out and cut off the vehicle motor if the rider falls off the vehicle.

1 Claim, 8 Drawing Figures

MOTORVEHICLE SAFETY CUT-OUT SWITCH

BACKGROUND OF THE INVENTION

This invention relates to motorcylces, and more particularly to a safety device for cutting out a motorcycle engine in the event the rider loses control for any reason.

Motorcycle riders are encouraged to wear protective gear. The most important item is a safety helmet with a plastic face shield attached. Boots and gloves are other important items. In addition to these items, it is recommended that the rider wear a leather jacket and heavy pants, all to protect the body as much as possible in the event of a collision or a spill. These items are particularly important in races, rallies, trail riding and hill climbing when the rider can be expected to test the limits of his skill from time to time such that a spill can be expected. However, except for the helmet, these items provide only limited protection against abrasions.

Once the rider leaves his motorcycle, in a collision or a spill, the uncontrolled vehicle becomes a lethal instrument endangering the spilled rider and others. The level of danger is greatly reduced if the rider is able to kill the engine as he leaves the motorcycle. Some motorcycles are equipped with a cut-out switch on the right handlebar just forward of the starter switch, but that is only for convenience in a controlled stop. It is not reasonable to expect the rider to use is in a collision or a spill.

The high level of danger is due not just to the momentum of the motorcycle carrying it into other persons or vehicles, but due to the fact that the engine is still running and engaged. Most motorcycles have a spring biased throttle which cuts the engine back to idle when the throttle grip is released, but the throttle cable or linkage often jams in the open position, and even at idle speed the chain and driven wheel turn at a significantly high speed.

The drive chain and driven wheel of a riderless motorcycle are a menace to everyone around, particularly the fallen rider since he is likely to become entangled with the chain or wheel. On off-road motorcycles of the type for trail riding and hill climbing, the tires have tread designs that are particularly knobby. Consequently, the tire of the driven wheel can itself inflict grave injury, particularly if it wedges some limb of the rider between the tire and the motorcycle fender or frame. The driving chain is, of course, always a lethal instrument; it is a virtual chain saw that will easily cut through leather and heavy garments.

In the past, I have experimented with the use of a safety switch functionally like a cut-out switch, but arranged to close a ground contact to the ignition coil when an insulating tab (connected to the wrist of the rider with a lanyard) is pulled out automatically upon the rider losing his grip on the handle bar. One arrangement I have used consists of biasing one end of a metal strip against the handlebar, as with a rubber band midway between the two ends. The other end is insulated from the handlebar and connected to the ignition coil. The one end against the handlebar is lifted and the insulating tab is inserted. Friction holds the inserted tab in place until yanked out by the lanyard. While this safety cut-out switch is effective, there is a problem of holding the tab in place under extreme vibrations.

To make the task of inserting the tab easier, I have experimented with a design involving two leaf springs biased against each other, but bent outwardly away from each other at their ends. While this does make insertion of the tab easier, the problem of keeping the tab in place is made more difficult since the tab is now in a protruding position normal to the handle bar. There is also the problem that it is too easily disengaged temporarily, as by bending one leaf spring away beyond its elastic limits to a position where it is no longer normally in contact with the other leaf spring. While it can be restored to its normal position by bending it back, the purpose of the safety device is in the meantime defeated. In other words, a rider may easily disengage the cut-out switch; but that next ride may be the very time it is needed.

OBJECTS AND SUMMARY OF THE INVENTION

An object of this invention is to provide an improved safety cut-out switch.

Another object is to provide a safety cut-out switch that is not so easily disengaged to make sure the rider will use it as intended during every ride.

Other objects and advantages of the present invention are achieved by a safety cut-out switch for a motorcycle ignition system comprising a housing adapted to be strapped to a metal member of a motorcycle with one contact of the switch grounded to the metal member which serves as circuit ground for the motorcycle ignition system. The other contact is connected to an electrical lead adapted to be connected directly, or indirectly (as through the ignition switch), to the ignition coil of the ignition system such that when the switch is closed, the motorcycle engine is cut out. The housing includes means having a flaired and resilient opening for receiving a spherical body, and means responsive to the pressure of the spherical body within the retaining means for opening the switch to disconnect the one contact from the other. The spherical body is connected to a lanyard adapted to be secured to a motorvehicle rider. The effective diameter of the resilient opening across at least two diametrically opposed points is less than the diameter of the spherical body such that, once the spherical body is inserted into the retaining means through the resilient opening, it will be held in place until yanked out by the lanyard. The tension on the lanyard may be in a direction that can vary from an optimum direction normal to the resilient opening to any direction at 90° or more to the optimum direction, i.e., over a wide range of directions approximately hemispheric in angularity.

DESCRIPTION OF THE PREFERRED EMBODIMENTS

Figure 1:
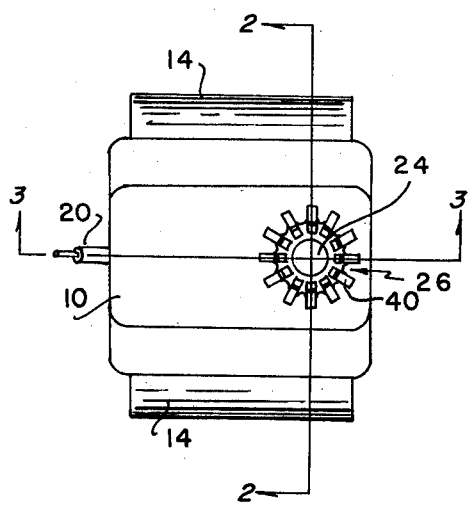
FIG. 1 is a plan view of a first embodiment of the present invention.
Figure 2:
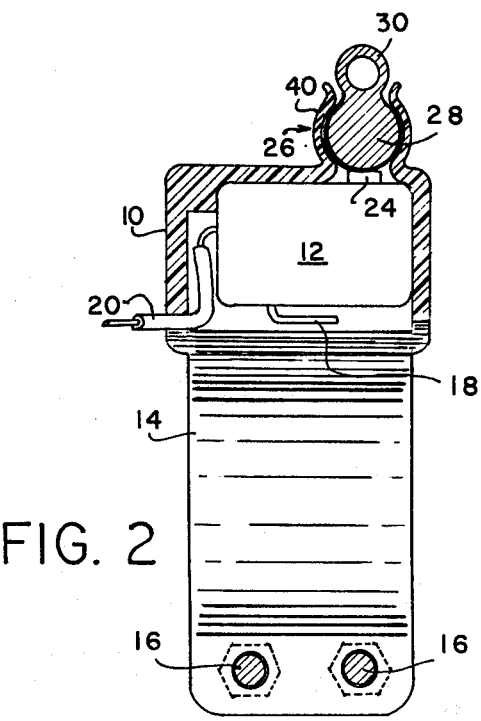
FIG. 2 is a sectional view taken on a line 2—2 of FIG. 1.
Figure 3:
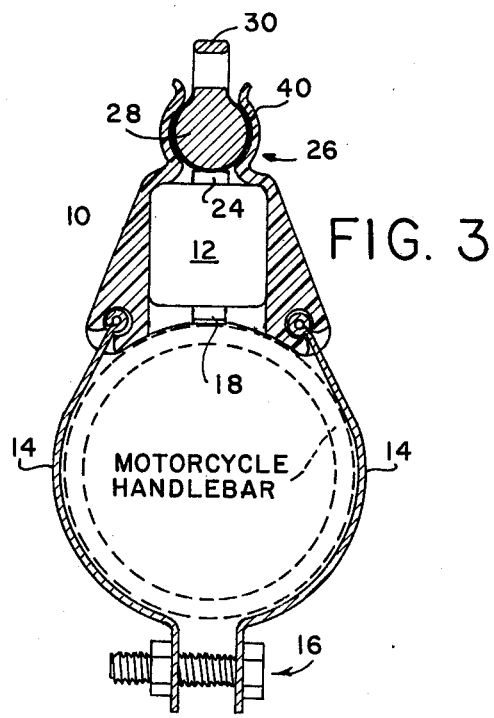
FIG. 3 is a sectional view taken on a line 3—3 of FIG. 1.

Referring to the drawings, a first embodiment of the present invention illustrated in FIGS. 1 through 3 is comprised of a housing 10 for a switch 12 adapted to be strapped to a motorcycle handlebar by straps 14 with nut and bolt assemblies 16. It is contemplated that the switch 12 be a separate self-contained and sealed unit, as shown in the sectional views of FIGS. 2 and 3 taken along respective lines 2—2 and 3—3 of FIG. 1. The switch may be any one of many commercially available push-button switches of the two-point-break type such as commonly used to turn off a glove compartment light in an automobile when the door is closed.

Figure 4:
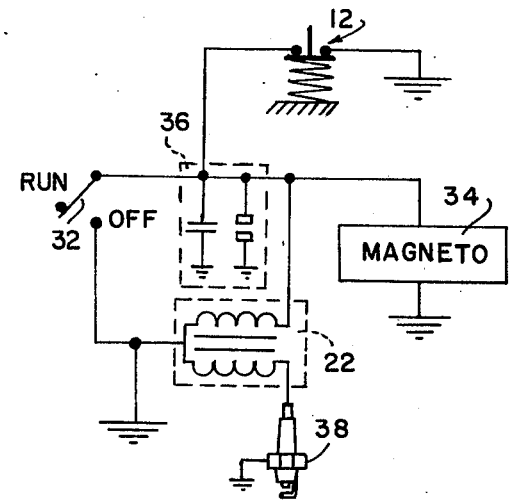
FIG. 4 is a schematic diagram showing the connection of the device of FIG. 1 to the ignition system of a typical motorcycle.
Figure 8:
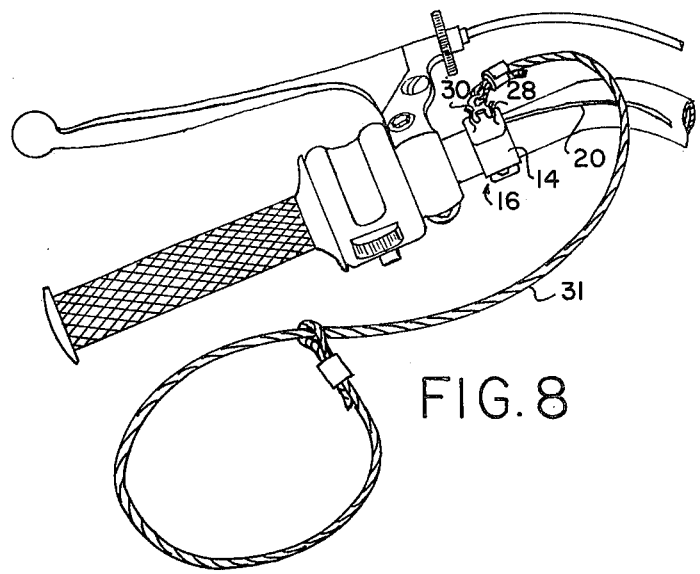
FIG. 8 illustrates the device of FIG. 1 or FIG. 5 on the left handlebar of a motorcycle.

In the closed position, the switch 12 provides electrical continuity from a tab 18 to an insulated lead 20. When the device is strapped to a motorcycle handlebar as shown in FIG. 8, the tab 18 is grounded to the frame of the motorcycle to effectively ground the primary winding of the ignition coil 22 of the motorcycle, as shown in FIG. 4. The handlebar is indicated by a dotted line in FIG. 3. A plunger 24 protrudes from the switch 12 to permit the switch contacts to be opened upon depressing the plunger against the force of the spring biasing the contacts closed.

The housing 10, molded of plastic material as shown, or of metal, is provided with integral and resilient means 26 for receiving and retaining a spherical body 28 FIGS. 2 and 3) in a position depressing the plunger 24 to maintain the contacts of the switch 12 open. The spherical body 28 is provided with an integral ring 30 for the purpose of connecting a lanyard 31 (FIG. 8) to it. The lanyard is used to yank the spherical body 28 from the resilient retaining means 26. In practice, the free end of the lanyard is provided with a loop which fits over the wrist of a motorcycle rider so that, in the event of a collision or a spill, the spherical body 28 is automatically yanked out of the retaining means 26 to release the plunger 24, thus allowing the spring biased contacts of the switch 12 to close and cut out the motorcycle engine.

A convenient place to connect the lead 20 of the switch 12 is at the ignition switch 32 of the motorcycle, as shown in FIG. 4 for a motorcycle having a magneto 34. When the ignition switch is in the off position it connects the primary winding of the ignition coil 22 to circuit ground (motorcycle frame). While the ignition switch is in the run position, the ground connection to the primary winding of the ignition coil is removed to permit a contact breaker 34 and ignition coil 22 to function in firing a spark plug 38.

In order for the engine to run with the ignition switch in the run position, the motorcycle rider must insert the spherical body 28 into the resilient retaining means 26 as shown in FIGS. 2 and 3, thereby opening the contacts of the switch 12. Consequently, once the spherical body 28 is yanked from the resilient retaining means 26, the switch 12 closes to cut out the engine.

It should be noted that, in the ignition system of a motorcycle having no battery shown in FIG. 4, a simple and direct connection at the ignition switch is feasible because the magneto 34 is not operative once the engine is cut off even though the ignition switch is still in the run position. In a motorcycle having a battery ignition system it may be desirable to disconnect the battery whenever the safety cut-off switch is closed, as will be described with reference to FIG. 11. Otherwise, the battery could be discharged while the ignition switch is in the run position.

The resilient means 26 for retaining the spherical body 28 is comprised of a plurality of finger-like elements 40 molded as integral parts of the housing 10 and shaped to fit snugly around the spherical body 28. The end of each finger-like element is curved outwardly to facilitate forcing them outwardly as the spherical body 28 is inserted. Once the center of the spherical body enters past the curved ends of the finger-like elements, the elements will move the spherical body into place, with the plunger 24 depressed sufficiently to open the switch contacts.

A total of twelve finger-like elements are provided in the embodiments of FIG. 1, but in practice any number of finger-like elements may be provided greater than one, each element being shaped with an internal surface corresponding to the shape of the spherical body 28. However, too small a number, such as two or three, would require each element to be wider with the result that the elements may be too stiff. Four elements as shown in the second embodiment of FIG. 5 would therefore be a practical minimum, while the number 12 shown in the embodiment of FIG. 1 would be a practical upper limit.

Figure 5:
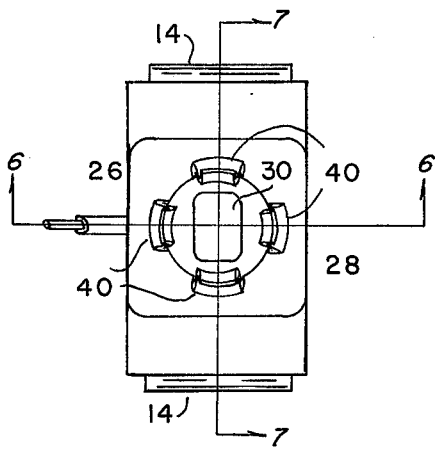
FIG. 5 is a plan view of a second embodiment of the present invention.
Figure 6:
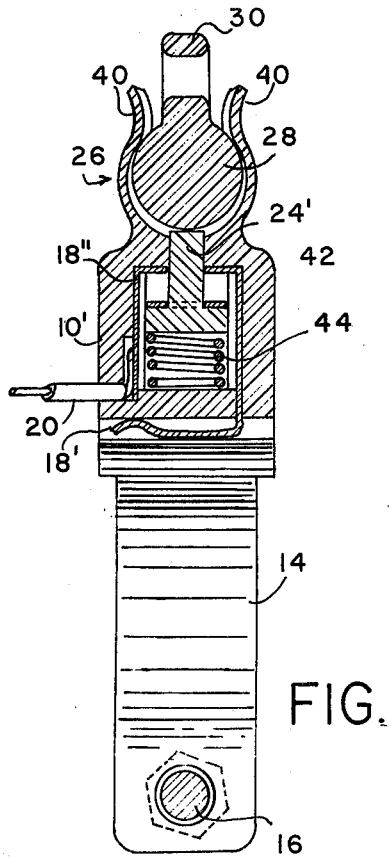
FIG. 6 is a sectional view taken on a line 6—6 in FIG. 5.
Figure 7:
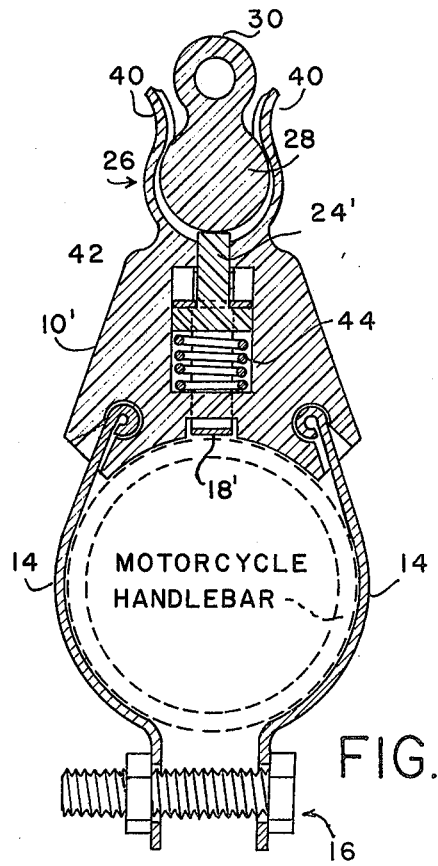
FIG. 7 is a sectional view taken on a line 7—7 in FIG. 5.

Referring now to the second embodiment of FIGS. 5 through 7, the switch housing 10 adapted to be strapped to the handlebar of the motorcycle serves as the body of the cut-out switch. Consequently, the housing is in this case required to be molded out of nonconductive material, such as any one of a number of different plastic materials commercially available.

To facilitate assembly of the switch within the housing 10, the housing may be molded in two parts such that the sectional view of FIG. 6 taken along the line 6—6 of FIG. 5 is the face of one part that will mate with the complementary face of the other part. The two halves are then cemented, fused or bolted together after the switch parts are assembled in the housing as shown. The first part of the switch inserted into the housing is an element 18' adapted to make a contact with the handlebar of a motorcycle (indicated in FIG. 7 by dotted lines). The element 18' is L-shaped with the end of the upright arm bent parallel over the other arm. The one arm fits into a channel in the housing to hold it in the position shown. A second element 18" having its upper end bent to the right as viewed in FIG. 6 fits into a channel that is made wider at the bottom to accommodate the lead 20 soldered to the element 18".

The elements 18' and 18" have sufficient width to cause them to protrude from the channels in that half of the housing shown in FIG. 6. The other half of the housing is provided with corresponding channels to interlock with the elements 18' and 18". The plunger 24', molded of nonconductive material, is inserted into the housing between the elements 18'and 18" with a metal ring 42 cemented onto a shoulder of the plunger. When the second half of the housing is added and the spherical body 28 is in place, the plunger 24' is depressed against the force of a spring 44 to cause the metal ring 42 to move away from the contact elements 18' and 18", thus breaking electrical continuity between the contact element 18' and the lead 20.

Although particular embodiments of the invention have been described and illustrated herein, it is recognized that modifications and variations may readily occur to those skilled in the art. It is therefore intended that the claims be interpreted to cover such modifications and variations.

The embodiment of the invention in which an exclusive property or privilege is claimed is described as follows:

1. A safety cut-out switch for a motorvehicle ignition system comprising: a switch spring biased in a closed position; Means for connecting said switch to said ignition system to cut out said ignition system when said switch is closed; a spherical body; a housing for said switch rigidly secured to said motorvehicle, said housing including retaining means having a flaired and resilient opening for receiving and releasably holding said spherical body, and having means for opening said switch in response to the presence of said spherical body within said housing; and a lanyard having one end thereof connected to said spherical body and the other end adapted to be secured to a vehicle rider whereby said lanyard may pull said spherical body out of said housing by tension in a wide range of directions approximately hemispheric in angularity.

* * * * *